United States Patent [19]
Kim

[11] Patent Number: 6,038,210
[45] Date of Patent: Mar. 14, 2000

[54] DEVICE FOR SWITCHING OVER DOUBLE MODULE

[75] Inventor: Jae-Seob Kim, Gunpo, Rep. of Korea

[73] Assignee: SamSung Electronics Co., Ltd., Kyungki-do, Rep. of Korea

[21] Appl. No.: 08/845,180

[22] Filed: Apr. 21, 1997

[30] Foreign Application Priority Data

Apr. 19, 1996 [KR] Rep. of Korea ...................... 96-11954

[51] Int. Cl.$^7$ ...................................................... H04L 1/22
[52] U.S. Cl. ................ 370/216; 340/825.16; 340/825.17
[58] Field of Search ......................... 340/825.16, 825.17, 340/825.01; 370/216, 217, 221, 228, 222; 714/2, 13

[56] References Cited

U.S. PATENT DOCUMENTS

| | | | |
|---|---|---|---|
| 3,845,472 | 10/1974 | Buchanan | 370/222 |
| 4,455,601 | 6/1984 | Griscom et al. | |
| 4,654,784 | 3/1987 | Campanini | |
| 4,672,535 | 6/1987 | Katzman et al. | |
| 4,710,952 | 12/1987 | Kobayashi | |
| 4,752,927 | 6/1988 | Melling, Jr. | 340/825.01 |
| 4,797,670 | 1/1989 | Joyner | 340/825.17 |
| 5,251,299 | 10/1993 | Masuda et al. | |
| 5,408,462 | 4/1995 | Opoczynski | |
| 5,426,420 | 6/1995 | Nagler | |
| 5,570,345 | 10/1996 | Kaprielian et al. | |

*Primary Examiner*—Edwin C. Holloway, III
*Attorney, Agent, or Firm*—Robert E. Bushnell, Esq.

[57] ABSTRACT

A switchover device switches over a double module between first and second modules manually or automatically, in which the control signals and switchover signals are generated with of the logic combination circuits and relays, to simplify signal processing of the system. The device for switching over the double module with first and second modules, includes a key input circuit including a mode setting key and a module selecting key, a manual switchover circuit for selectively generating a first control signal for switching over to the first module and a second control signal for switching over to the second module in response to input of the module selecting key, an automatic switchover circuit for selectively generating the first and second control signals according to first and second status signals generated from the first and second modules, a switchover mode selecting circuit for selectively outputting signal outputs of the manual switchover circuit and the automatic switchover circuit in response to input of the mode setting key, and a control selecting circuit for forming a communication path to the first or second module in response to the first and second control signals from the switchover mode selecting circuit.

14 Claims, 13 Drawing Sheets

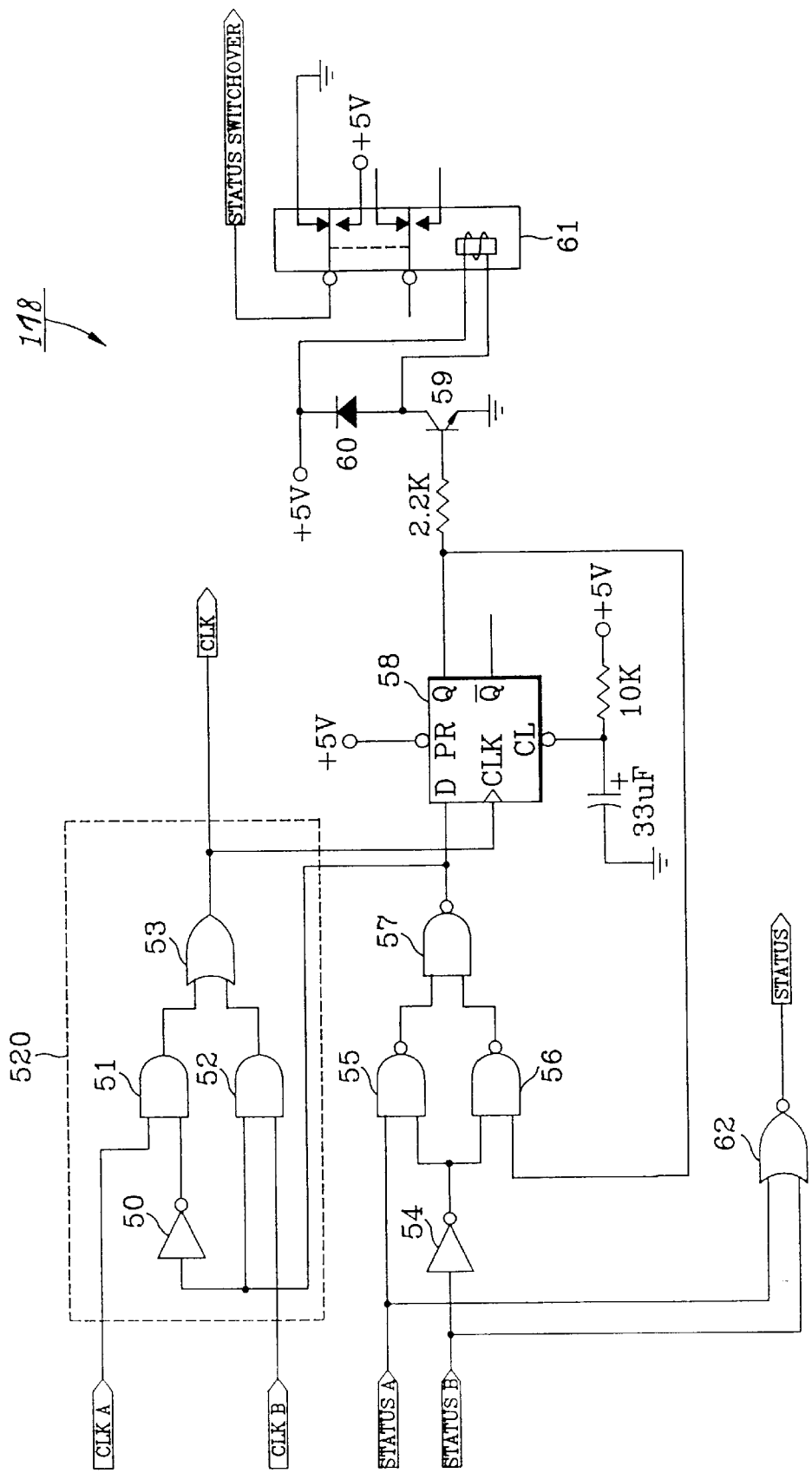

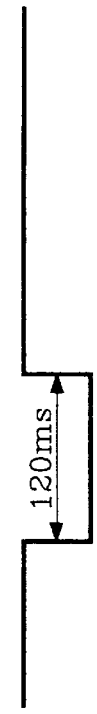
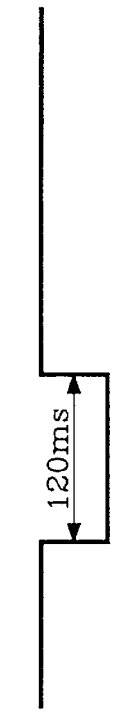
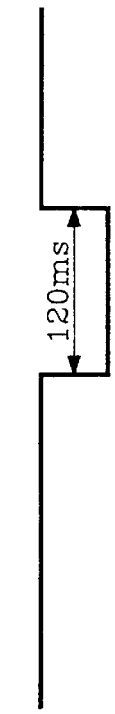
Fig. 6A  SWITCH REQ A OR SWITCH REQ B
Fig. 6B  SWITCH RESP A OR SWITCH RESP B
Fig. 6C  SWITCH ACK A OR SWITCH ACK B
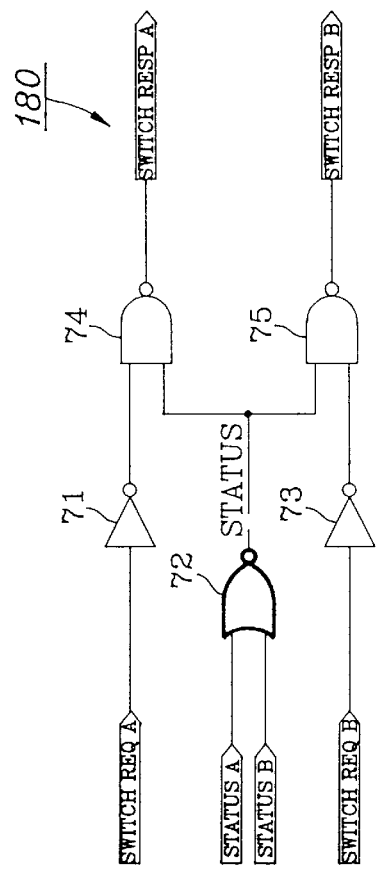
Fig. 7

DEVICE FOR SWITCHING OVER DOUBLE MODULE

CLAIM FOR PRIORITY

This application makes reference to, incorporates the same herein, and claims all benefits accruing under 35 U.S.C. §119 from an application for DEVICE FOR SWITCHING OVER DOUBLE MODULE earlier filed in the Korean Industrial Property Office on Apr. 19, 1996, and there duly assigned Ser. No. 11954/1996.

BACKGROUND OF THE INVENTION

1. Technical Field

The present invention relates to a switch over device, and more particularly, relates to a device for switching over a double construction.

2. Related Art

Conventional highly reliable communication systems typically contain standby modules which operate in parallel to active modules and a specific processor which controls switching between the active or standby modules for communication protection purposes. Exemplary switching arrangements are disclosed in U.S. Pat. No. 4,455,601 for Cross Checking Among Service Processors In A Multiprocessor System issued to Griscom et al., U.S. Pat. No. 4,654,784 for Circuit Arrangement For Routing Signals Between A Master-Slave Pair Of Controlling Processors And Several Master-Slave Pairs Of Controlled Processing Units issued to Campanini, U.S. Pat. No. 4,710,952 for Distributed Control Type Electronic Switching System issued to Kobayashi, U.S. Pat. No. 5,251,299 for System For Switching Between Processors In A Multiprocessor System issued to Masuda et al., U.S. Pat. No. 5,408,462 for Protection Switching Apparatus And Method issued to Opoczynski, and U.S. Pat. No. 5,570,345 for Protection Switching System With Single Line Control issued to Kaprielian et al.

Generally, an active/standby mode is determined by the specific processor for controlling a double construction which is a double board supporting communication modules. Upon detecting a change of the status of the double construction, the processor switches over the active/stand-by status. Then, the active module is activated and the standby module is deactivated. Such operations are controlled by the processor. Therefore, the software for the processor may become complicated. Moreover, since the processor controls a switchover signal through bus lines, a control process may become complicated, and may not be diversified.

While the conventional switching systems such as disclosed in Griscom et al. '601, Campanini '784, Masuda '299, Opoczynski '462, and Kaprielian et al. '345 are technically noteworthy, I have observed that these switching systems may not be suitable for switching over the double module because of their structural problems. Accordingly, I believe that switchover device can still be improved.

SUMMARY OF THE INVENTION

Therefore, it is an object of the present invention to provide a switching device for manually switching over first and second modules of a double module.

It is another object to provide a switching device for automatically switching over first and second modules of a double module in response to status signals from the first and second modules.

It is still another object to provide a switching device for automatically switching over a double module in response to switchover request signals from first and second modules.

These and other objects of the present invention can be achieved by a device for switching over a double module with first and second modules, which includes a key input circuit including a mode setting key and a module selecting key, a manual switchover circuit for selectively generating a first control signal for switching over to the first module and a second control signal for switching over to the second module in association with the module selecting key, an automatic switchover circuit for selectively generating the first and second control signals according to first and second status signals generated from the first and second modules, a switchover mode selecting circuit for selectively outputting signal outputs of the manual switchover circuit and the automatic switchover circuit in response to input of the mode setting key, and a control selecting circuit for forming a communication path to the first or second module in response to the first and second control signals from the switchover mode selecting circuit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 is a detailed diagram of a status abnormality-responsive switchover circuit of the switching device as shown in FIG. 1;

FIGS. 6A–6C are waveforms of a switchover request in an automatic switchover operation according to the present invention;

FIG. 7 is a detailed diagram of a circuit for generating a switchover response signal according to a switchover request signal in a request-responsive switchover circuit of FIG. 1;

DETAILED DESCRIPTION OF THE PREFERRED EMBODIMENT

According to the principles of the present invention, a switchover is classified as a manual switchover and an automatic switchover. The manual switchover indicates that a given module becomes active or remains in a stand-by mode manually by an operator using a switch key. By contrast, the automatic first switchover includes a switchover function responsive to a status switchover of a double module, i.e., a status abnormality, and includes a second switchover function responsive to a switchover request for the active/stand-by mode in the case where the modules of the double module are at a normal status. Here, the switchover responsive to the switchover request (hereinafter referred to as "request-responsive switchover") is performed in such a manner that a corresponding module makes a request for the switchover to the active/stand-by mode.

In short, the manual switchover operates by means of controlling the manual switch key. The automatic switchover operates in two ways: one way is to switchover a module from a stand-by mode to an active mode, if an abnormality occurs in the module currently in operation; the second way is to switch over the module of the active/stand-by mode in response to a signal requesting for switching the operational mode by the operator, when the modules of the double module are all in the normal status. In both manual and automatic switchover functions, there is a priority order. That is, the manual switchover has a higher priority than to the automatic switchover. Further, in the automatic switchover mode, the switchover responsive to the status abnormality (i.e., abnormality-responsive switchover) has a higher priority than to the request-responsive switchover.

Figure 1:
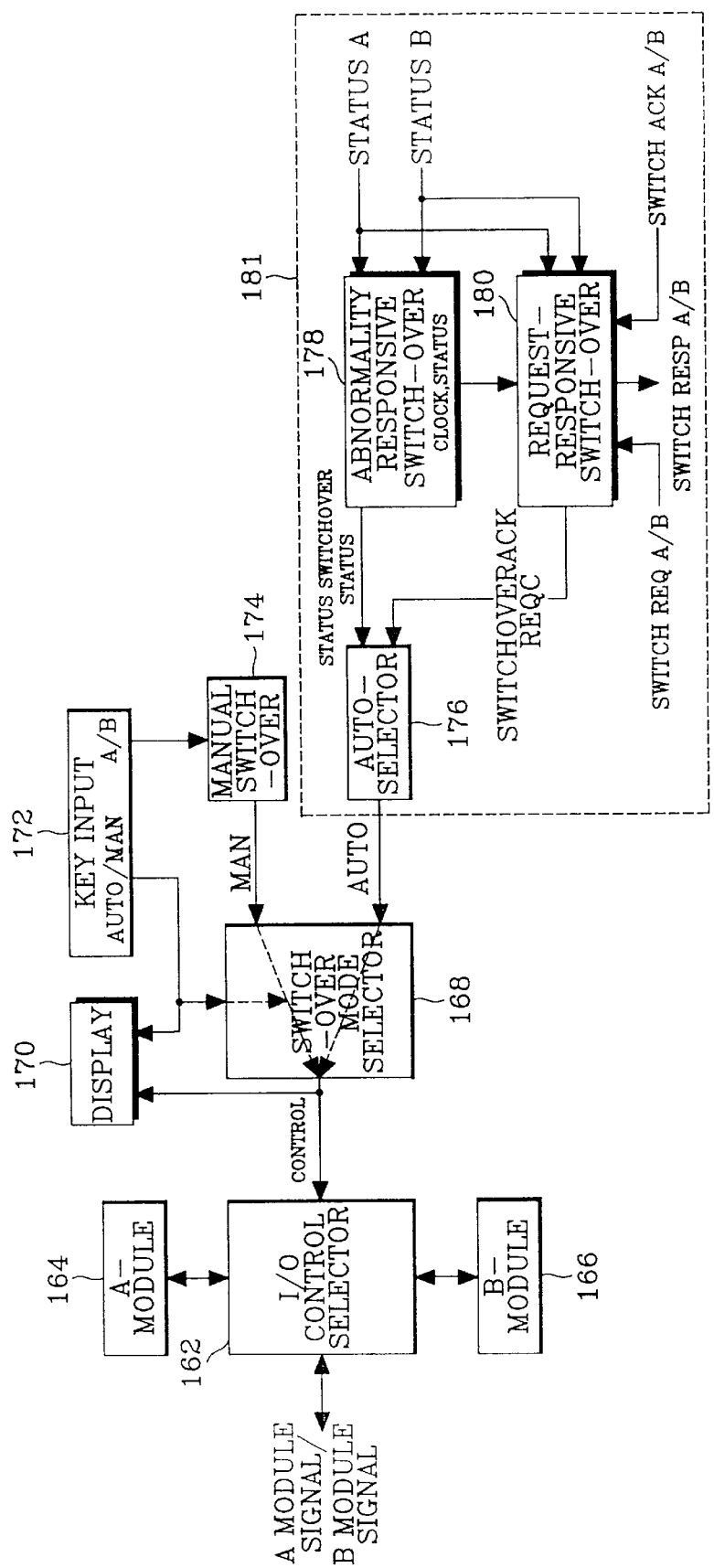
FIG. 1 is a block diagram of a switching device for switching over a double module constructed according to the principles of the present invention.

Referring now to the drawings and particularly to FIG. 1, which illustrates a switching device for switching over a double module having an A-module 164 and a B-module 166 as constructed according to the principles of the present invention. The switching device may be applied to a paging system including a plurality of communication modules, such as input processor (IP) module, central paging processor (CPP) module, network simulcast controller (NSC) module, and line switching module (LSM). If the switching device is applied to the paging system, then the (CPP) module having a subscriber's data base and the NSC module for encoding data and modulating the same into an analog signal may preferably constitute the double module.

As shown in FIG. 1, the switching device includes a key input circuit 172 having at least an automatic/manual switch key and an A/B-module switch key. The key input circuit 172 is located in front of the switchover device and is operated by the operator. A manual switchover circuit 174 connected to the A/B-module switch key of the key input circuit 172 generates a manual control signal MAN which consists of first and second control signals for switching over to the A-module 164 and the B-module 166 respectively in association with the A/B-module switch key.

An automatic switchover circuit 181 includes a status abnormality-responsive switchover circuit 178, a request-responsive switchover circuit 180, and an automatic selector 176. The automatic switchover circuit 181 receives first and second status signals STATUS_A and STATUS_B generated from the A-module 164 and the B-module 166, so as to generate an automatic switchover signal AUTO consisting of first and second control signals when the first and second status signals STATUS_A and STATUS_B are activated in response to the status abnormality. The automatic switchover circuit 181 also generates the automatic switchover signal AUTO in response to first and second switchover request signals SWITCH REQ_A and SWITCH_REQ_B, when the status signals STATUS_A and STATUS_B are not activated.

A switchover mode selector 168 receives an output signal from the manual switchover circuit 174, if a automatic/manual switch key AUTO/MAN of the key input circuit 172 is switched to the manual mode. Alternatively, the switchover mode selector 168 receives an output signal from the automatic switchover circuit 181, if the switch key AUTO/MAN is switched to the automatic mode. A control selector 162 is connected between the A-module 164 and the B-module 166 and serves to couple the A-module 164 or B-module 166 to a peripheral device (not shown) through an input/output terminal I/O thereof, in response to a control signal output from the switchover mode selector 168. For example, the control selector 162 couples the A-module 164 to the input/output terinal I/O thereof when the control signal is at a logic low state, and couples the B-module 166 to the input/output terminal I/O when the control signal is at a logic high state.

A display unit 170 displays a status of an automatic/manual operational mode in association with the automatic/manual switch key AUTO/MAN of the key input circuit 172, and displays operational status of the A-module 164 or the B-module 166 in response to the control signal generated from the switchover mode selector 168.

Figure 2:
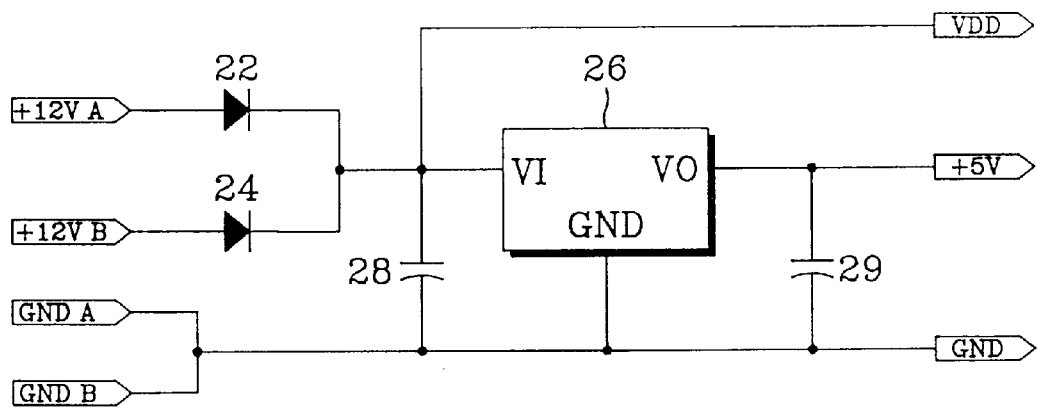
FIG. 2 is a circuit diagram of a common power supply for the switching device constructed according to the principles of the present invention.

FIG. 2 illustrates a common power supply for the switching device constructed according to the principles of the present invention. The common power supply rectifies first and second voltages of 12 Volts respectively received from the A-module 164 and the B-module 166 by way of rectifying diodes 22 and 24, and supplies the rectified voltage to a power supply terminal VDD. A voltage regulator 26 then regulates the rectified voltage of 12 Volts to generate a stable voltage output of 5 Volts. Capacitors 28 and 29 are connected in parallel with the voltage regulator 26 at the front and rear stages thereof respectively, so as to remove ripple voltages from the rectified and regulated voltages.

Figure 3:
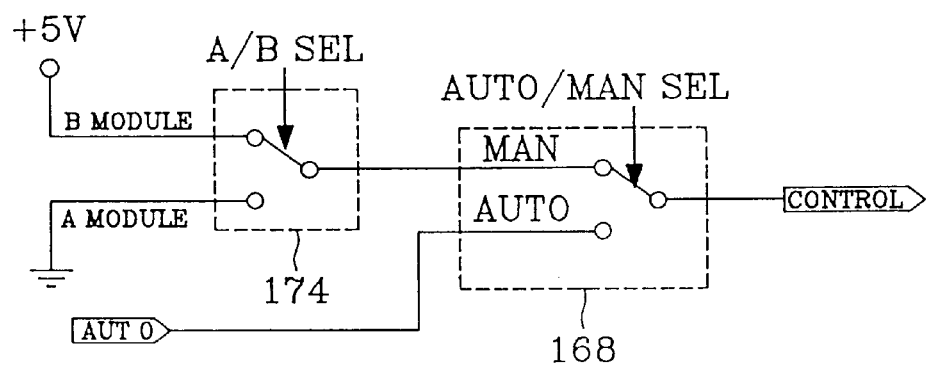
FIG. 3 is a detailed circuit diagram of a manual switchover circuit and a switchover mode selector of the switching device as shown in FIG. 1.

Turning now to FIG. 3 which illustrates a detailed circuit diagram of a manual switchover circuit 174 and a switchover mode selector 168 of the switching device as shown in FIG. 1. The manual switchover circuit 174 generates a first control signal of 5 Volts or a second control signal of a ground voltage in association with a status of the A/B-module switchover key of the key input circuit 172. The switchover mode selector 168 has a first terminal connected to a signal MAN from the manual switchover circuit 174, a second terminal connected to a signal AUTO from the automatic switchover circuit 181, and a switching terminal connected to the control selector 162. Therefore, the switchover mode selector 168 selectively generates either the signal MAN or the signal AUTO in association with the automatic/manual switch key AUTO/MAN of the key input circuit 172. Here, the signals MAN and AUTO consist of the first control signal of 5 Volts and the second control signal of the ground voltage, respectively. Further, the signal AUTO is supplied from the automatic selector 176.

Figure 4A:
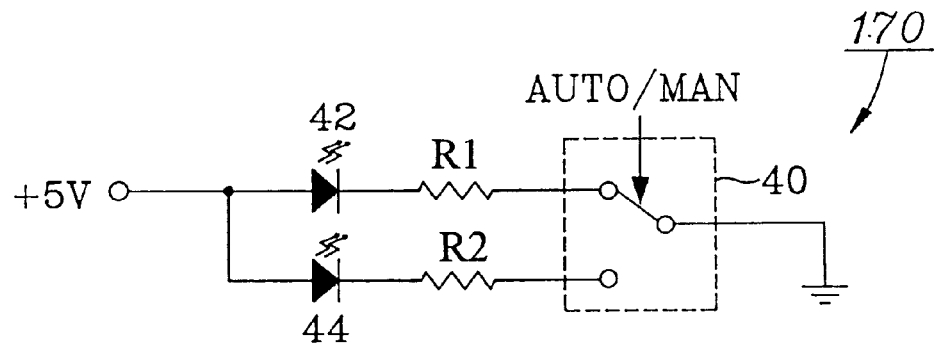
FIG. 4A is a detailed circuit diagram of a display unit of the switching device, as shown in FIG. 1, for displaying an operational status of an automatic/manual switching mode.
Figure 4B:
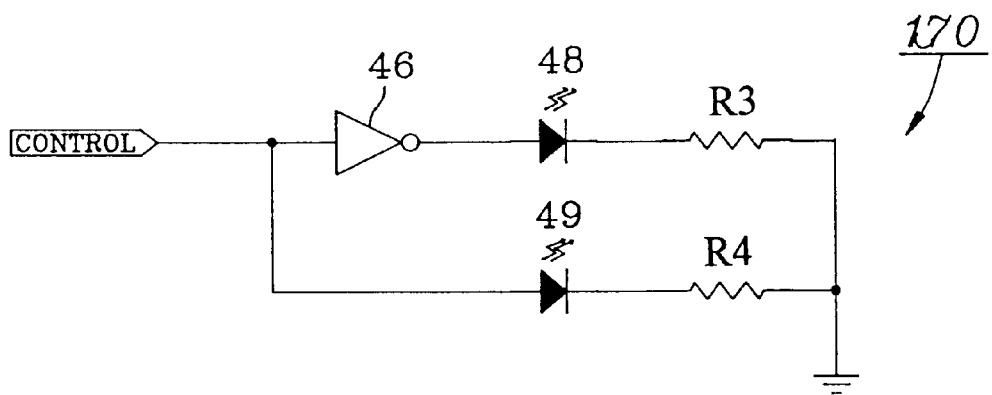
FIG. 4B is a detailed circuit diagram of a display unit of the switching device, as shown in FIG. 1, for displaying an operational status of an activated module.

FIGS. 4A and 4B are detailed circuit diagrams of a display unit 170 of the switching device as shown in FIG. 1 for displaying an operational status of the automatic/manual switching mode and an operational status of an activated module. FIG. 4A illustrates a construction of the display unit 170 for displaying whether the switchover mode is set to the manual mode or the automatic mode according to the automatic/manual switch key AUTO/MAN. Such a construction includes a switch 40 and a pair of LEDs (light emitting diodes) 42, 44 which are connected in parallel between the switch 40 and a power source of 5 Volts. The switch 40 has a first terminal connected to a cathode electrode of the first LED 42 via a resistor R1, a second terminal connected to a cathode electrode of the second LED 44 via a resistor R2, and a switching terminal connected to the ground. When the key input circuit 172 is switched to the automatic mode, the switching terminal of the switch 40 is switched to the first terminal, thereby turning on the first LED 42. Alternatively, if the key input circuit 172 is switched to the manual mode, the switching terminal of the switch 40 is switched to the second terminal, thereby turning on the second LED 44. Namely, the LEDs 42 and 44 are exclusively turned on in response to the switching status of the automatic/manual switch key AUTO/MAN, indicating the corresponding switchover mode which is now in operation.

FIG. 4B illustrates a construction of the display unit 170 for displaying an operational status of an activated module. The construction includes an inverter 46 which is connected to a control terminal to receive the control signal from the switchover mode selector 168, and another pair of LEDs 48, 49 which are connected in series with a pair of resistors R3, R4 but in parallel between the control terminal and a ground terminal. A third LED 48 is activated when the control signal is at the logic low level. Alternatively, a fourth LED 49 is activated when the control signal is at the logic high level. Therefore, when the first control signal of the logic low level is applied, the third LED 48 is turned on and the fourth LED 49 is turned off. On the contrary, when the second control signal of the logic high level is applied, the third LED 48 is turned off and the fourth LED 49 is turned on. It is therefore noted that the third LED 48 is associated with the A-module 164 and the fourth LED 49 is associated with the B-module 166.

FIG. 5 illustrates a construction of the status abnormality-responsive switchover circuit 178 of the automatic switchover circuit 181 which is activated when the automatic/manual switch key AUTO/MAN is switched to the automatic mode. As shown in FIG. 5, the status signals STATUS_A and STATUS_B generated from the A-module 164 and the B-module 166 become the logic low level when the respective modules are in the normal status and otherwise, become the logic high level when the modules are in the abnormal status. Further, a signal output SCL at the output terminal of a D flip-flop 58 is initially at the logic low level. First, if the status signals STATUS_A and STATUS_B, and the signal SCL are all at the logic low level, a signal SSC at the output terminal of a NAND gate 57 becomes the logic low level. Then, a transistor 59 is turned off and a relay 61 for supplying the operating power is inactivated, thereby generating a first status switchover signal STATUS_SWITCHOVER of the ground level. Further, a status signal STATUS at the output terminal of a NOR gate 62 becomes the logic high level.

Second, if the B-module 166 is in the abnormal status, the status signal STATUS_B goes to the logic high level and thus, the signal SSC goes to the logic low level. Therefore, the signal SCL becomes the logic low level and consequently, the transistor 59 is turned off, thereby generating the first status switchover signal STATUS_SWITCHOVER of the low level. Further, the status signal STATUS becomes the logic low level.

Third, if the A-module 164 is in the abnormal status, the status signal STATUS_A goes to the logic high level and thus, the signal SSC goes to the logic high level. Therefore, the signal SCL becomes the logic high level and consequently, the transistor 59 is turned on. Then, the relay 61 is is activated, generating a second status switchover signal STATUS_SWITCHOVER of +5 Volts. Further, the status signal STATUS becomes the logic low level.

A clock generator 520 selectively outputs any one of clock signals CLK_A and CLK_B generated respectively from the A-module 164 and the B-module 166, in response to the signal SSC. In detail, when the system is in the normal status or the B-module 166 is in the abnormal status, the signal SSC becomes the logic low level so that the clock generator 520 outputs, as an output CLK, the clock signal CLK_A by way of an AND gate 51 and an OR gate 53. Alternatively, if the A-module 164 is in the abnormal status, the signal SSC becomes the logic high level so that the clock generator 520 outputs, as the output CLK, the clock signal CLK_B by way of an AND gate 52 and the OR gate 53.

Table 1 expresses a truth table according to the status of the A-module 164 and the B-module 166.

TABLE 1

|  | STATUS_A | STATUS_B | SSC | STATUS SWITCHOVER | STATUS | CLK |
|---|---|---|---|---|---|---|
| NORMAL STATUS | L | L | L | L | H | CLK_A |
| A MODULE ABNORMAL | H | L | H | H | L | CLK_B |
| B MODULE ABNORMAL | L | H | L | L | L | CLK_A |

As shown in Table 1, the signals STATUS_SWITCHOVER and STATUS are to be supplied to the automatic selector 176 of the switching device as later shown in FIG. 10. It should be noted that the clock signals CLK_A and CLK_B are 300 Hz.

The switchover operation responsive to the request, i.e., an operation of the request-responsive switchover circuit 180 will be described hereinbelow. First, it should be noted that the request-responsive switchover can be requested at any of the active and stand-by modes. In detail, when the request is made by the module in the active mode, the module in the active mode switches over to the stand-by mode and the module in the stand-by mode switches over to the active mode. Similarly, when the request is made by the module in the stand-by mode, the module in the stand-by mode switches over to the active mode and the module in the active mode switches over to the stand-by mode.

FIGS. 6A–6C are timing diagrams of signals generated during the request-responsive switchover operation, in which switchover request signals SWITCH_REQ_A and SWITCH_REQ_B are generated from the respective modules 164 and 166. As shown in FIGS. 6A and 6B, the switchover request signals SWITCH REQ_A and SWITCH REQ_B are at the logic high level during the normal status, and maintains the logic low level for about 120 ms when requesting the switchover. The switchover response signals SWITCH_RESP_A and SWITCH_RESP_B are generated from the request-responsive switchover circuit 180 and exhibit the same waveforms as those of the switchover request signals SWITCH_REQ_A and SWITCH_REQ_B. The switchover response signals SWITCH_RESP_A and SWITCH_RESP_B are applied to the corresponding A and B modules 164 and 166, respectively. In the meanwhile, upon detecting the switchover response signals SWITCH_RESP_A and SWITCH_RESP_B, the modules that requested the switchover generates a switchover acknowledgment signals SWITCH_ACK_A and SWITCH_ACK_B as shown in FIG. 6C to the request-responsive switchover circuit 180 for checking whether or not the switchover acknowledgment signals SWITCH_ACK_A and SWITCH_ACK_B have a duty cycle of 120 ms.

FIG. 7 illustrates a circuit for generating the switchover response signals SWITCH_RESP_A and SWITCH_RESP_B in response to the switchover request signals SWITCH_REQ_A and SWITCH_REQ_B, prepared in the request-responsive switchover circuit 180. As shown in FIG. 7, this circuit includes a pair of inverters 71, 73 which are coupled in parallel to the switchover request signals SWITCH_REQ_A and SWITCH_REQ_B, a OR gate 72 which receives the status signals STATUS_A and STATUS_B generated from the A-module 164 and B-module 166, and a pair of NOR gates 74 which are coupled in parallel to receive outputs of the inverters 71, 73 and the OR gate 72 respectively, so as to generate the switchover response signals SWITCH_RESP_A and SWITCH_RESP_B respectively.

The circuit is activated in response to the status signal STATUS of the logic high level. On the contrary, when the status signal STATUS is at the logic low level, both the switchover response signals SWITCH_RESP_A and SWITCH_RESP_B go to the logic high level. Therefore, when the A-module 164 and the B-module 166 are all in the normal status, the switchover response signals SWITCH_RESP_A and SWITCH_RESP_B are activated.

In case where the switchover request signals SWITCH_REQ_A and SWITCH_REQ_B generated respectively from the A-module 164 and the B-module 166 make a transition from the logic high level to the logic low level, if the status signal STATUS is at the logic high level, the switchover response signals SWITCH_RESP_A and SWITCH_RESP_B also make a transition from the logic high level to the logic low level, thereby generating the waveforms as shown in FIGS. 6A–6C.

Figure 8A:
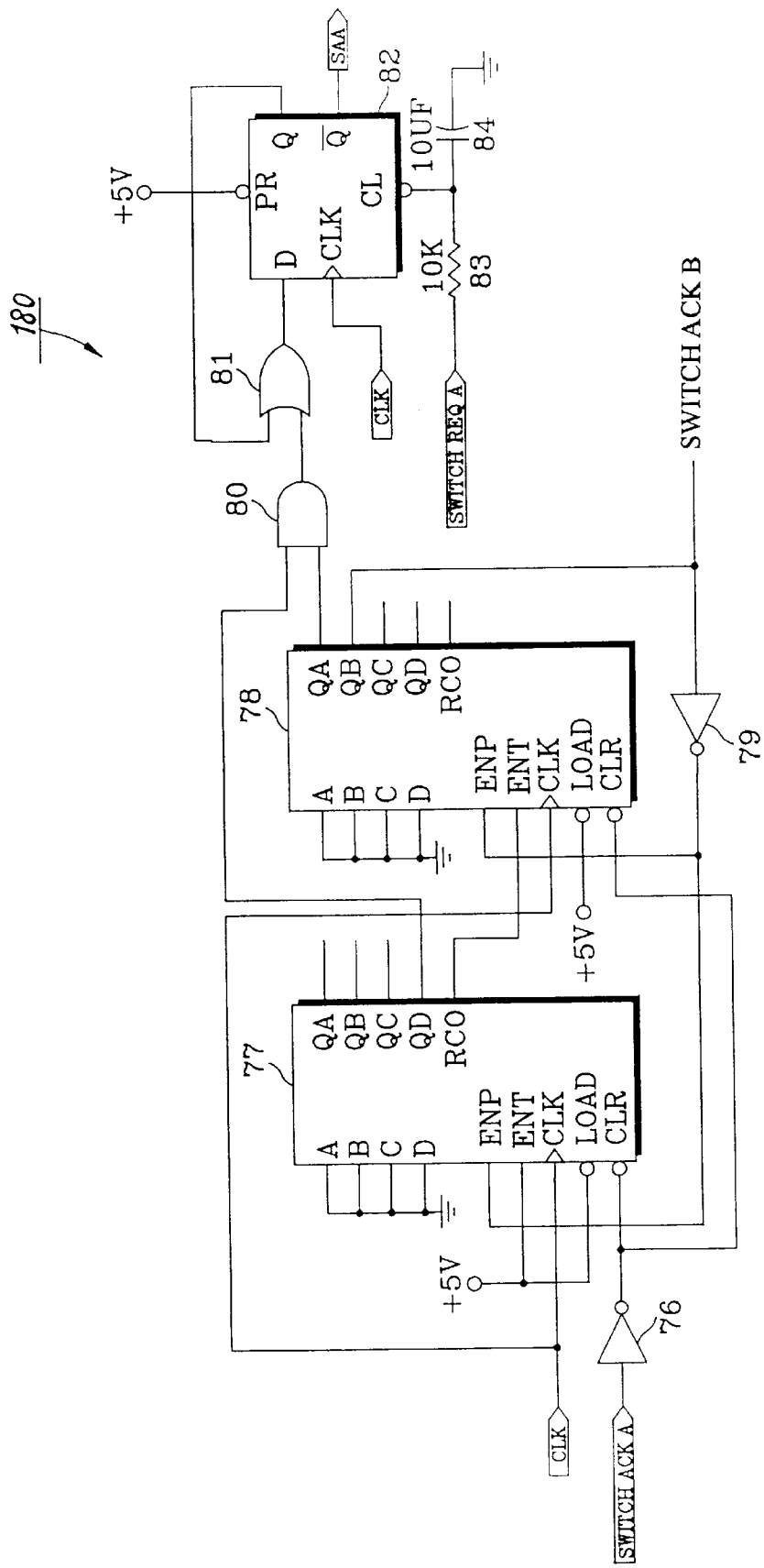
FIGS. 8A and 8B are detailed circuit diagrams of a switchover arranging signal generator in the request-responsive switchover circuit of FIG. 1.
Figure 8B:
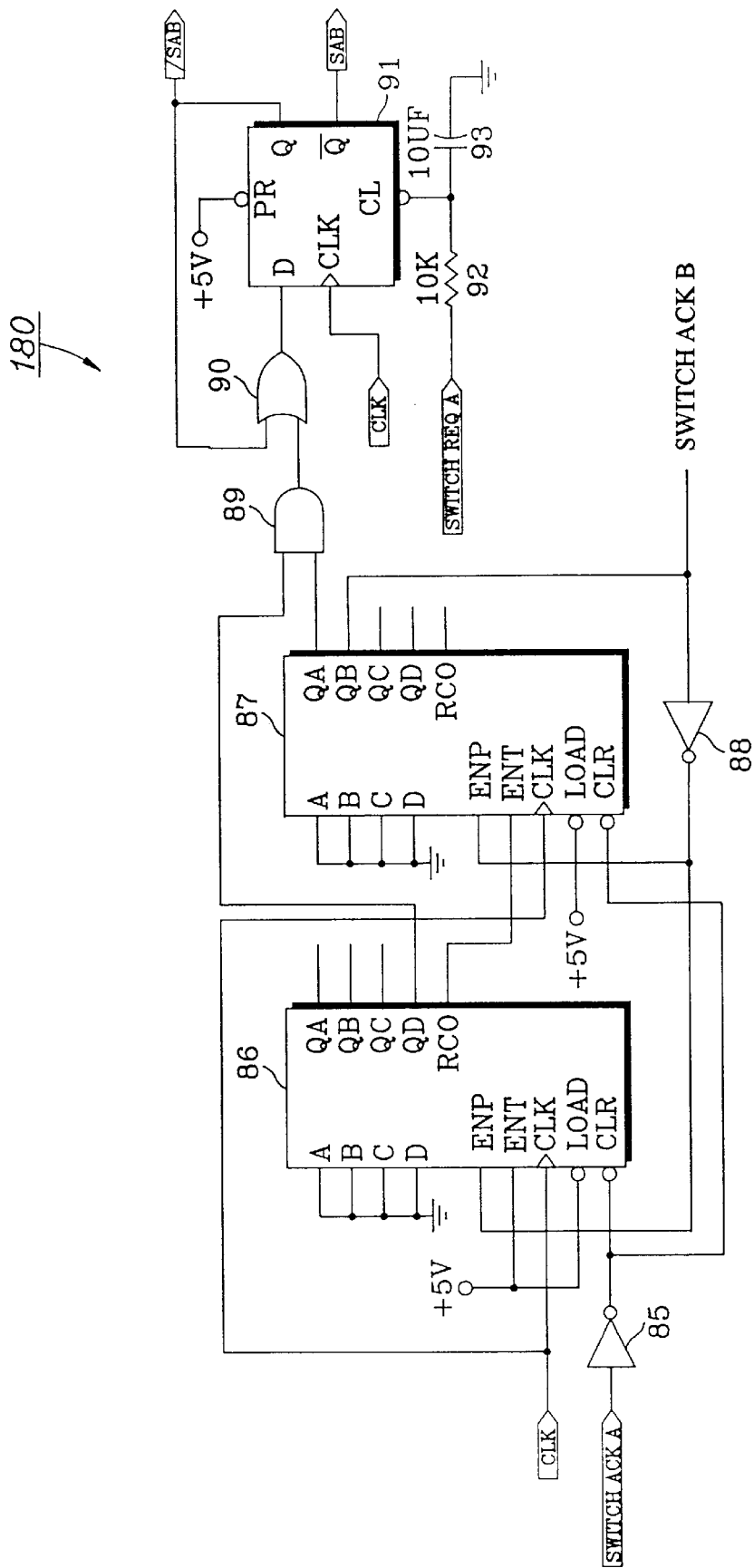

Referring now to FIGS. 8A and 8B, there are shown the request-responsive switchover circuit 180 including a circuit for generating switchover arranging signals SAA and SAB according to the switchover acknowledgment signals SWITCH_ACK_A and SWITCH_ACK_B which are generated respectively from the A-module 164 and the B-module 166 in response to the switchover response signals SWITCH_RESP_A and SWITCH_RESP_B. In practice, counters 77, 78, 86 and 87 may be embodied by a commercial chip 74HC163. If the switchover acknowledgment signal SWITCH_ACK_A or SWITCH_ACK_B from the corresponding module 164 or 166 that has made the switchover request goes to the logic low level, the counters (77, 78) or (86, 87) receive the logic high level at the clear terminals CLR thereof by way of a NOT gate 76 or 85. Here, the counters 77, 78, 86, and 87 are activated when the logic high level is applied to enable terminals ENP and ENT, and the logic low level is applied to the clear terminals CLR. Then, the counters 77, 78, 86, and 87 count up from zero to sixteen in synchronism with the rising edges of the clock signal applied to clock terminals CLK thereof The counters generate the logic high level at a seventeenth rising edge of the clock signal through a ripple carry output (RCO) terminal.

Thus, the counters (77, 78) or (86, 87) operate for the duration of 120 ms when the switchover acknowledgment signal SWITCH_ACK_A or SWITCH_ACK_B of the logic low level are applied. In this way, the counter 77 or 86 begins a counting operation and generates, through an output terminal QD, the logic high level to an input terminal of an AND gate 80 or 89 at a ninth rising edge of the clock signal CLK. Further, the counter 77 or 86 generates, through a ripple carry output terminal RCO, the logic high level to the enable terminal ENT of the counter 78 or 87 at a seventeenth rising edge of the clock signal CLK. Then, the counter 78 or 87 begins the counting operation and generates, through an output terminal QA, the logic high level to another input terminal of the AND gate 80 or 89 at a second rising edge of the clock signal CLK. In the meanwhile, if the counter 78 or 87 generates a signal ACK_A or ACK_B of the logic low level through an output terminal QB thereof, the counters (77, 78) or (86, 87) are provided with the logic high level at the enable terminals ENP thereof, thereby being initialized. If the input signals applied to the AND gate 80 or 89 are both at the logic high level, a D flip-flop 82 or 91 generates the logic high level at an output terminal Q thereof and the logic low level at an inverse output terminal/Q. The truth table of the circuit of FIGS. 8A and 8B is expressed in Table 2.

TABLE 2

| | SWITCH_ACK_A | SWITCH_ACK_B | SAA | /SAB | SAB |
|---|---|---|---|---|---|
| INITIAL STATUS | H | H | H | L | H |
| A MODULE SWITCHOVER REQ | L | H | L | L | H |
| B MODULE SWITCHOVER REQ | H | L | H | H | L |

In Table 2, the "initial status" indicates that the switchover request signals SWITCH_REQ_A and SWITCH_REQ_B are not generated. Further, it should be noted that the truth table is available under the condition that the A-module 164 and the B-module 166 are all in the normal status.

The signals ACK_A and ACK_B go from the logic low level to the logic high level, if the switchover acknowledgment signals SWITCH_ACK_A and SWITCH_ACK_B maintain the activated low level over 100 ms. Further, the AND gates 80 and 89 generate the logic high level, if the switchover acknowledgment signals SWITCH_ACK_A and SWITCH_ACK_B maintain the activated low level over 80 ms. Namely, the circuit counts the input signal of the logic low level, to check whether or not the input signal is the switchover acknowledgment signals SWITCH_ACK_A and SWITCH_ACK_B.

Figure 9:
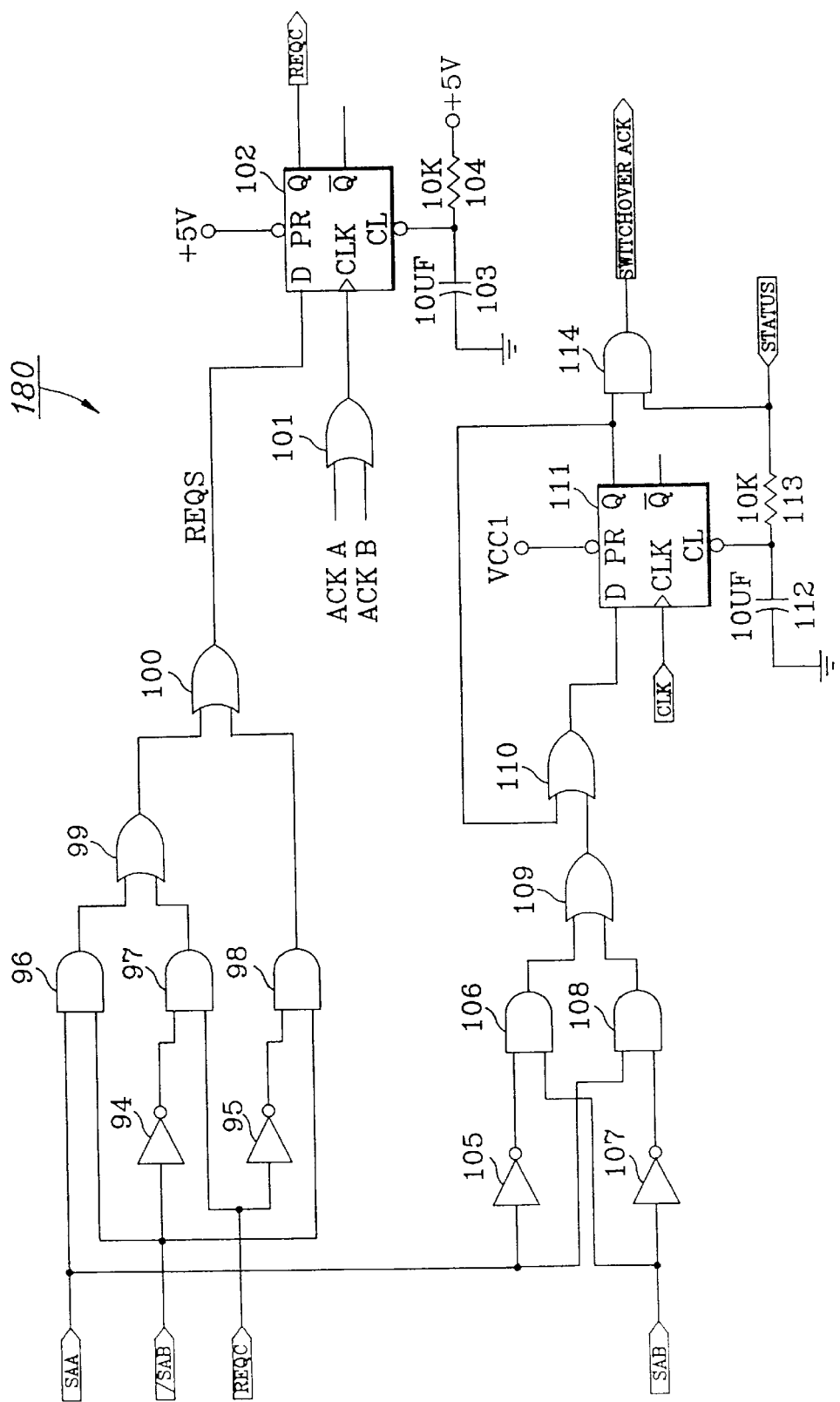
FIG. 9 is a detailed diagram of a circuit for generating a switchover signal in response to switchover arranging signals in the request-responsive switchover circuit of FIG. 1.

Referring to FIG. 9, there is shown the request-responsive switchover circuit 180 which generates a switchover acknowledgment signal SWITCHOVER_ACK and a switchover request signal REQC from the switchover arranging signals SAA and SAB. In the drawing, a signal REQS is generated by logically combining the signals SAA,/SAB, and REQC. A D flip-flop 102 receives, through the clock terminal CLK thereof, the output signal of an OR gate 101 having input terminals connected to the signals ACK_A and ACK_B of FIGS. 8A and 8B. Thus, the D flip-flop 102 outputs the signal REQS, as the output signal REQC, when the signal ACK_A or ACK_B is activated to the logic high level. Further, the signals SAA and SAB are logically combined by using gate elements 105–110 to generate its output to an input terminal D of a D ffip-flop 111. An AND gate 114 receives the output signal from the D flip-flop 111 and the status signal STATUS from the status abnormality-responsive switchover circuit 178. Thus, when the status signal STATUS is at the logic low level, the AND gate 114 becomes inactivated generating the switchover acknowledgment signal SWITCHOVER_ACK of the logic low level. Namely, when the A-module 164 or the B-module 166 is in the abnormal status, the switchover acknowledgment signal SWITCHOVER_ACK maintains the logic low level. The truth table of the circuit of FIG. 9 is expressed in Table 3.

signal of +5 Volts or the ground level, in association with the switching operation of a transistor 115 which is controlled by the signal REQC. A second relay 120 selectively outputs the status switchover signal STATUS_SWITCHOVER or the output signal from the first relay 117 according to the switching operation of a transistor 119 which is controlled by the switchover acknowledgment signal SWITCHOVER_ACK. A third relay 122 selectively outputs the status switchover signal STATUS_SWITCHOVER or the output signal from the second relay 120 according to the switching operation of a transistor 124 which is controlled by the status signal STATUS. The truth table of the circuit of FIG. 10 is expressed in Table 4.

TABLE 4

|  | REQC | SWITCHOVER ACK | STATUS SWITCHOVER | STATUS | AUTO |
|---|---|---|---|---|---|
| INITAL STATUS | L | H | L | H | L |
| A MODULE ABNORMAL | L | L | H | L | H |
| B MODULE ABNORMAL | L | H | L | L | L |
| A MODULE | L | H | L | H | L |
| B MODULE SWITCHOVER REQ | H | H | H | H | H |

In Table 4, the "initial status" indicates that the A-module 164 and the B-module 166 are all in the normal status, and the switchover request is not made.

The automatic switchover signal AUTO from the third relay 122 is applied to the control selector 162 through the switchover mode selector 168 in case that the key input circuit 172 is switched to the automatic mode. For example, the device according to the present invention switches over to the A-module 164 in response to the signal AUTO of the logic low level, and to the B-module 166 in response to the signal AUTO of the logic high level.

The control signal output from the manual switchover circuit 174 or the automatic switchover circuit 181 is applied to the control selector 162 by means of the switchover mode selector 168. Referring to FIGS. 11A through 12B, the control selector 162 is illustrated in detail. The control selector 162 of FIGS. 11A and 11B inputs and outputs Ethernet, an inter-module communication signal in a paging system, to/from the A-module 164 and B-module 166 or the peripheral circuit. Further, the control selector of FIGS. 12A

TABLE 3

|  | SM | SAB | REQS | REQC | SWITCHOVER_ACK |
|---|---|---|---|---|---|
| INITAL STATUS | H | H | L | L | L |
| A MODULE SWITCHOVER REQ | L | H | L | L | H |
| B MODULE SWITCHOVER REQ | H | L | H | H | H |

In Table 3, the "initial status" indicates that the switchover request signals SWITCH_REQ_A and SWITCH REQ_B are not generated. Further, it should be noted that the truth table is available under the condition that the A-module 164 and the B-module 166 are all in the normal status.

Figure 10:
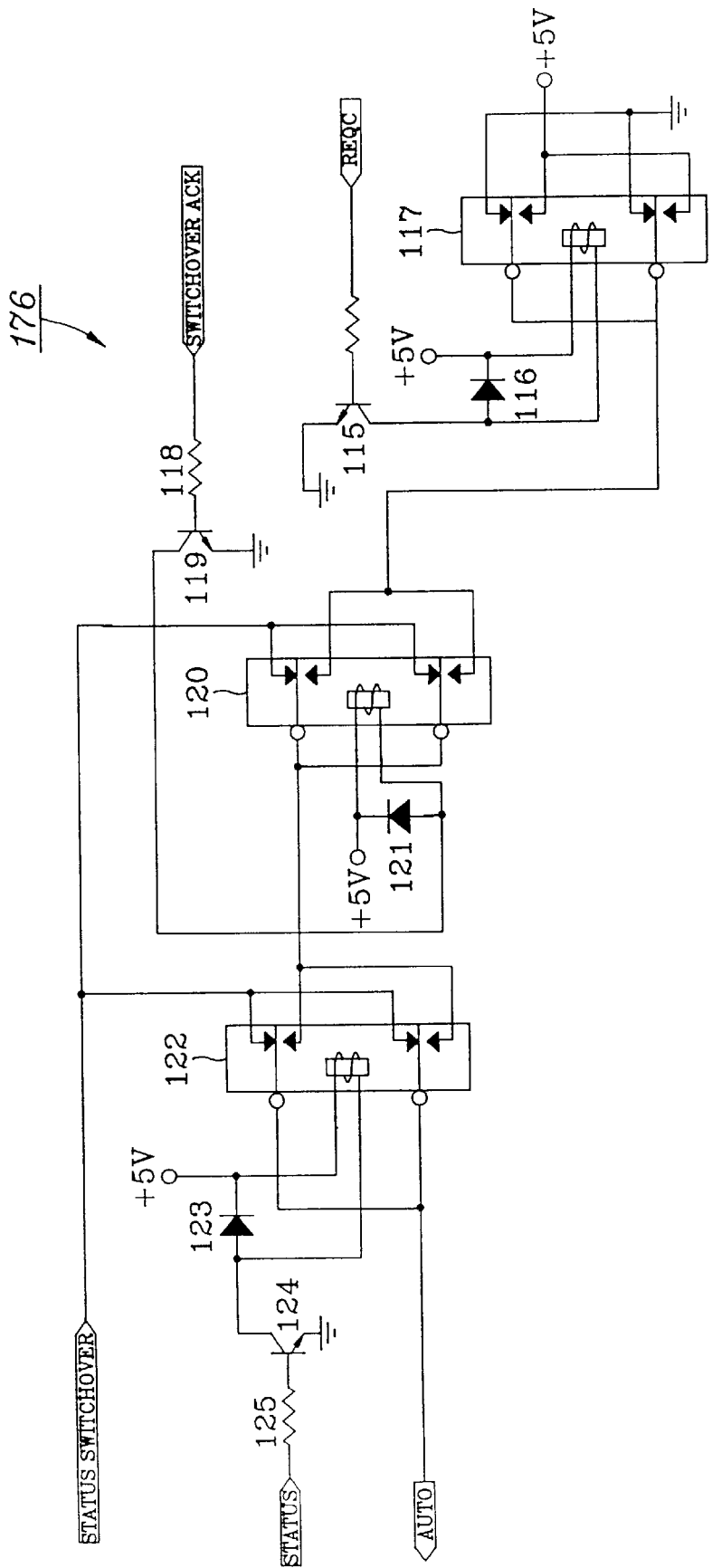
FIG. 10 is a detailed circuit diagram of an automatic selector of FIG. 1.

FIG. 10 illustrates a detailed circuit diagram of the automatic selector 176 for selecting the final control signal in association with the status switchover signal STATUS_SWITCHOVER and the status signal STATUS from FIG. 5, and the switchover acknowledgment signal SWITCHOVER_ACK and the signal REQC of FIG. 9. In the drawing, a first relay 117 operates to generate the output and 12B switches over a modem signal which is a communication signal between the paging system and the base station control module of the paging transmitter.

Figure 11A:
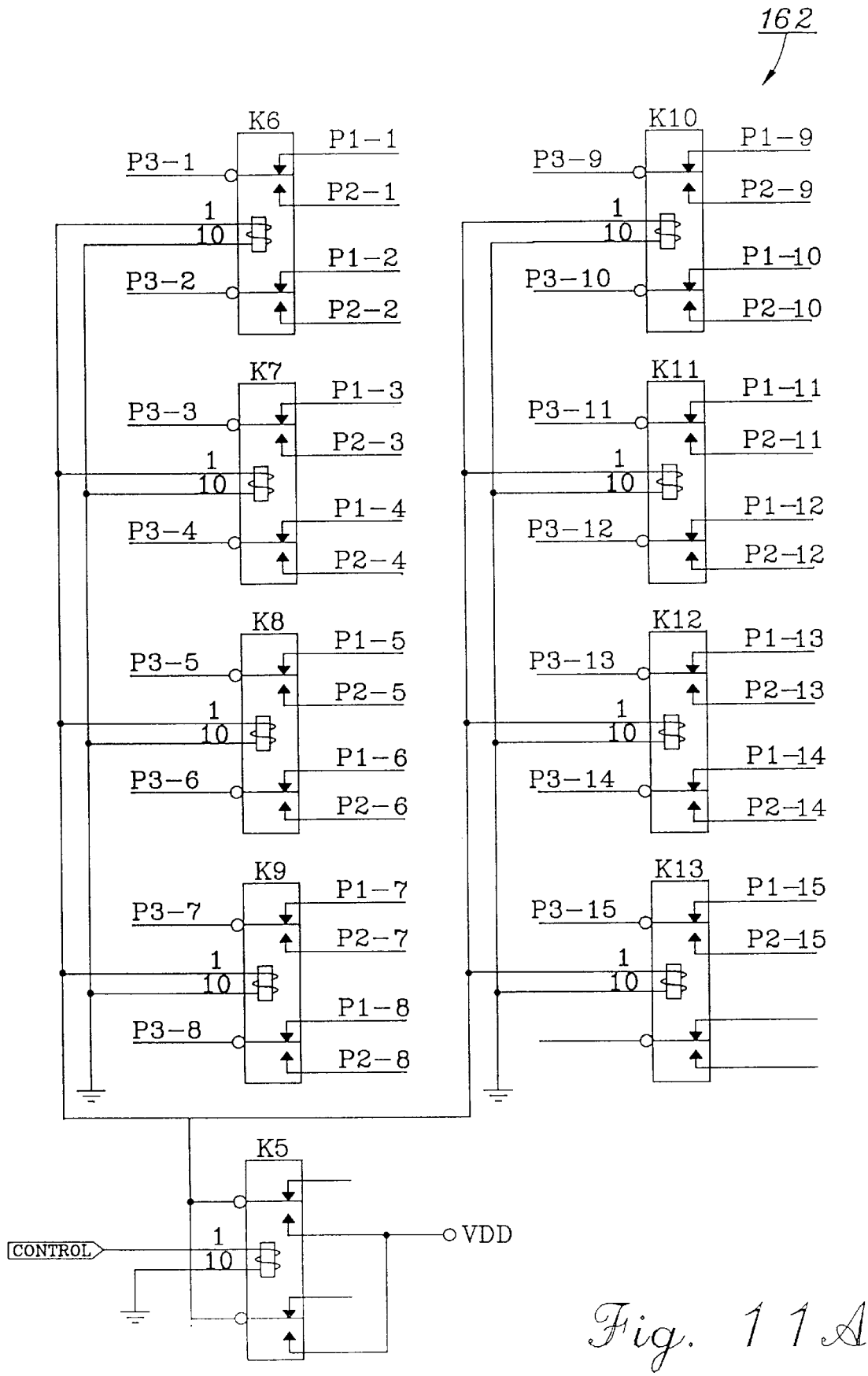
FIGS. 11A and 11B are detailed circuit diagrams of a control selector of FIG. 1 according to an embodiment of the present invention.
Figure 11B:
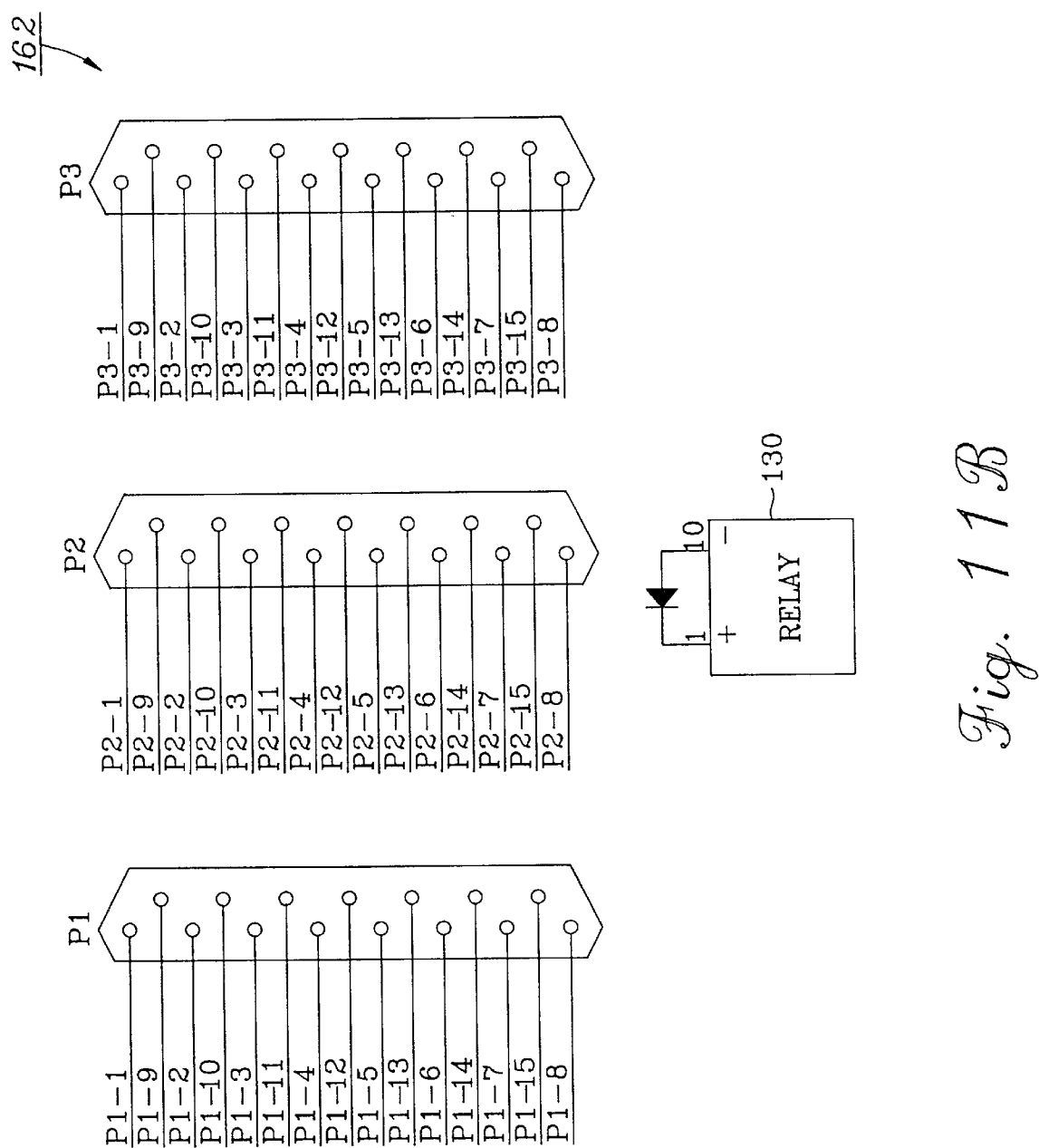

Referring first to FIGS. 11A and 11B, if the logic low level for switching over to the A-module 164 is applied to the control terminal CONTROL, relays K6–K13 are inactivated and thus, the terminals P3 (P3-1, P3-2, . . . , P3-15) connected to the peripheral circuit are switched to termina P1 (P1-1, P1-2, . . . , P1-15) connected to the A-module, forming a communication path to the A-module. Thus, the signals from the A-module 164 are outputted through the terminals P3. Alternatively, if the logic high level for switching over to the B-module 166 is applied to the control terminal, the respective relays K6–K13 are activated and thus, the terminals P3 are switched to terminals P2 (P2-1, P2-2, . . . , P2-15) connected to the B-module 166, forming a communication path between the B-module 166 and the peripheral circuit. A relay 130 is located between a pin number 1 and a pin number 10 of the respective relays K5–K15.

Figure 12A:
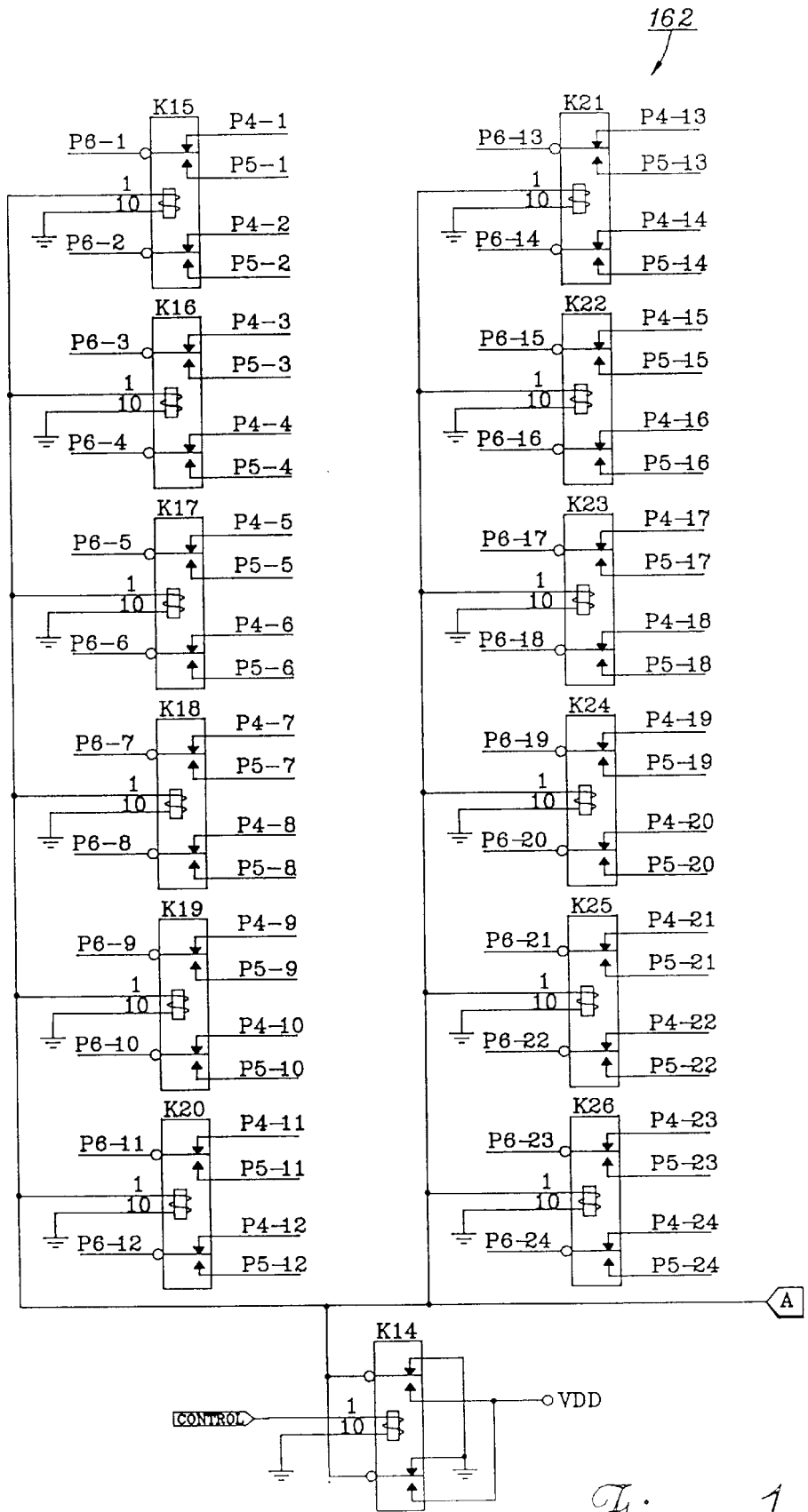
FIGS. 12A and 12B are detailed circuit diagrams of the control selector of FIG. 1 according to another embodiment of the present invention.
Figure 12B:
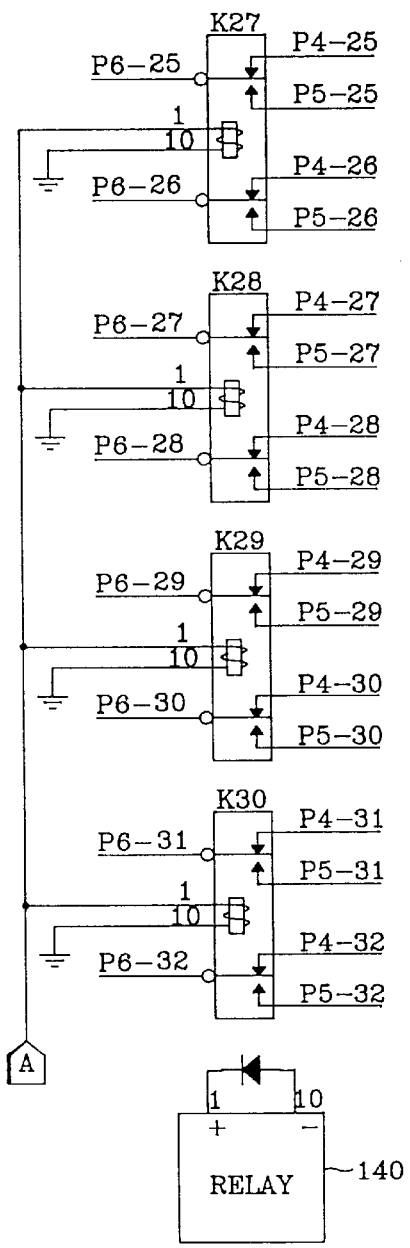

Referrihg to FIGS. 12A and 12B, if the control signal of the logic low level is applied to the control termihal CONTROL, a relay K14 is switched to the ground. Then, relays K15–K30 connected to the relay K14 are all inactivated. Thus, terminals P6 (P6-1, P6-2, . . . , P6-32) connected to peripheral circuit are switched to terminals P4 (P4-1, P4-2, . . . , P4-32) connected to the A-module 164, forming a communication path to the A-module 164. Alternatively, if the control signal of the logic high level is applied to the control terminal, the relay K14 is switched to a driving voltage VDD. Then, the relays K15–K32 are all activated. Thus, the terminals P6 are switched to terminals P5 (P5-1, P5-2, . . . , P5-32) connected to the B-module 166, thereby forming communication path to the B-module 166. In this way, the relays K15–K30 may switch over to the A-module 164 or the B-module 166 according to the logic status of the control signal.

As described above, the switching device constructed according to the principles of the present invention may be applied to a paging system comprised of a plurality of modules, such as input processor (IP) module, central paging processor (CPP) module, network simulcast controller (NSC) module, and line switching module (LSM). Among the above stated modules, the (CPP) module including a subscriber's data base and the NSC module for encoding data and modulating the data into an analog signal may preferably constitute the double module. In this case, the paging system employing the present invention processes the double module signals of the inter-module Ethernet communication signal and the modem signal of the NSC module. FIGS. 11A through 12B illustrate the circuit suitable for such paging system.

The switchover device constructed according to the present invention may switch over the double module manually or automatically, in which the control signals and switchover signals are generated by means of the logic combination circuits and the relays, thereby simplifying signal processing of the system. Since the device employs the relays for switching over the module, any one of the double module can still operate even when the electricity is cut off.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A switching apparatus switching over a double module including first and second modules, comprising:
   a key input unit including a mode setting switch and a device selecting switch said mode setting switch and said device selecting switch being switched by a user, said mode setting switch switching between setting an automatic mode and setting a manual mode, said device selecting switch switching between selecting said first module and selecting said second module;
   a manual switchover unit being electrically connected to said key input unit, selectively generating a first control signal for switching over to said first module and a second control signal for switching over to said second module according to a device selecting signal received from said device selecting switch of said key input unit;
   an automatic switchover unit selectively generating said first and second control signals according to first and second status signals and according to first and second switchover request signals, said automatic switchover unit further comprising:
      a status-responsive switchover unit receiving said first status signal from said first module, receiving said second status signal from said second module, said first status signal indicating a normal or an abnormal status of said first module, said second status signal indicating a normal or an abnormal status of said second module; and
      a request-responsive switchover unit selectively receiving said first switchover request signal from said first module and said second switchover request signal from said second module, said first and second switchover request signals corresponding to requests to switch between said first and second modules;
   a switchover mode selecting unit being electrically connected to said manual switchover unit and said automatic switchover unit and said key input unit, selectively outputting control signals received from said manual switchover unit and said automatic switchover unit according to input received from said mode setting switch; and
   a control selecting unit being electrically connected to said switchover mode selecting unit and said first and second modules, forming a communication path with one module selected from among said first and second modules respectively according to one of said first and second control signals output from said switchover mode selecting unit.

2. The apparatus of claim 1, further comprising said request-responsive switchover unit receiving said first and second switchover request signals only when said first and second status signals indicate that said first and second modules are in the normal status.

3. The apparatus of claim 2, further comprising:
   said automatic switchover unit activating said first status signal to generate said second control signal when said first module is in an abnormal status, and alternatively activating said second status signal to generate said first control signal when said second module is in the abnormal status; and
   said automatic switchover unit generating said first control signal when said first and second modules are in the normal status and said first module outputs said first switchover request signal to request a switchover between said first and second modules, and alternatively generating said second control signal when said first and second modules are in the normal status and said second module outputs said second switchover request signal to request a switchover between said first and second modules.

4. The apparatus of claim 3, further comprising said automatic switchover unit generating said first control signal when one of said first and second status signals is inactivated and all of said first and second switchover request signals are inactivated.

5. The apparatus of claim 1, further comprising:
said automatic switchover unit activating said first status signal to generate said second control signal when said first module is in the abnormal status, and alternatively activating said second status signal to generate said first control signal when said second module is in the abnormal status; and
said automatic switchover unit generating said first control signal when said first and second modules are in the normal status and said first module outputs said first switchover request signal to request a switchover between said first and second modules, and alternatively generating said second control signal when said first and second modules are in the normal status and said second module outputs said second switchover request signal to request a switchover between said first and second modules.

6. The apparatus of claim 1, further comprising said automatic switchover unit selecting a first clock generated from said first module when said first and second status signals are inactivated, selecting a second clock generated from said second module when said first status signal is activated, and selecting said first clock when said second status signal is activated.

7. The apparatus of claim 6, further comprising said automatic switchover unit generating said first control signal when one of said first and second status signals is inactivated and all of said switchover request signals are inactivated.

8. The apparatus of claim 1, further comprising a display unit displaying one mode selected from among said automatic mode and said manual mode according to said mode setting switch of said key input unit, and displaying an operation status indicating one module selected from among said first and second modules according to said first and second control signals received from said switchover mode selecting unit, said operation status indicating said first module when said first module is active and indicating said second module when said second module is active.

9. The apparatus of claim 8, further comprising said operation status indicating said first module when said first module is active and said second module is on standby, and indicating said second module when said second module is active and said first module is on standby.

10. The apparatus of claim 1, further comprising said first and second modules corresponding to a first line switching module and a separately located second line switching module, said first and second line switching modules being substantially similar.

11. The apparatus of claim 10, further comprising said first and second line switching modules being components of a paging system.

12. The apparatus of claim 1, said automatic switchover unit further comprising an automatic selecting unit having a first, second, and third relay for outputting said first and second control signals to said switchover mode selecting unit.

13. An apparatus switching over a double module including first and second devices, comprising:
a key input unit including at least an automatic/manual switch key and a first/second device switch key;
a manual switchover unit selectively generating a first control signal for switching over to said first device and a second control signal for switching over to said second device, in response to input of said first/second switch key;

a clock selecting unit selecting a first clock generated from said first device when first and second status signals generated from said first and second devices are not activated, and alternatively, when said second status signal is activated, and selecting a second clock generated from said second device when said first status signal is activated;
a status abnormality-responsive switchover unit being synchronized with said clock selecting unit, generating an activated status signal when said first or second status signal is not activated, and generating a first or second status switchover signal when said first or second status signal is activated;
a request-responsive switchover unit being synchronized with said clock selecting unit, generating, when said first or second status signal is not activated, a first or second switchover response signal to said first or second device in response to first or second switchover request signal generated from said first or second device, and thereafter, generating an activated switchover acknowledgment signal in response to first or second switchover acknowledgment signal generated from said first or second device, said request-responsive switchover unit generating a first corresponding switchover request signal when said first switchover request signal is activated, said request-responsive switchover unit generating a second corresponding switchover request signal when said second switchover request signal is activated, said first and second switchover request signals being received respectively from said first and second devices, said first and second switchover request signals corresponding to requests for switchovers among said first and second devices;
an automatic selecting unit generating said first and second control signals in response to said first and second status switchover signals when said status signal is not activated, and generating said first and second control signals in response to said first and second corresponding switchover request signals when said status signal is activated and said switchover acknowledgment signal is activated, said automatic selecting unit generating an inactivated status switchover signal as the first control signal when said switchover acknowledgment signal is not activated;
a switchover mode selecting unit generating the first and second control signals from said manual switchover unit when said automatic/manual switch key is switched to the manual mode, and generating the first and second control signals from said automatic selecting unit when said automatic/manual switch key is switched to the automatic mode;
a display unit displaying automatic or manual mode of operation in association with said automatic/manual switch key, and displaying an operational status of said first or second device in response to said first or second control signal; and
a control selecting unit forming a communication path between said first device and an input/output terminal when the first control signal is supplied from said switchover mode selecting unit, and forming a communication path between said second device and said input/output terminal when the second control signal is supplied from said switchover mode selecting unit.

14. The apparatus of claim 13, wherein said automatic selecting unit further comprises:

a first relay unit generating said first control signal when said first corresponding switchover request signal is received, and generating said second control signal when said second corresponding switchover request signal is received;

a second relay unit outputting an output of said first relay unit when the activated switchover acknowledgment signal is received, and outputting said first or second switchover signal when the inactivated switchover acknowledgment signal is received; and a third relay unit outputting an output of said second relay unit when the activated status signal is received, and outputting said first or second status switchover signal when the inactivated status signal is received.

* * * * *